US006425049B1

United States Patent
Yamamoto et al.

(10) Patent No.: US 6,425,049 B1
(45) Date of Patent: Jul. 23, 2002

(54) DISK ARRAY SYSTEM AND METHOD OF CHANGING THE CONFIGURATION OF THE DISK ARRAY SYSTEM

(75) Inventors: Masayuki Yamamoto; Naoto Matsunami, both of Sagamihara; Jun Matsumoto, Tokyo; Ikuya Yagisawa, Yokohama; Masahiko Sato, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/497,760

(22) Filed: Feb. 4, 2000

(30) Foreign Application Priority Data

Feb. 8, 1999 (JP) .............................. 11-029668

(51) Int. Cl.[7] .............................................. G06F 12/02
(52) U.S. Cl. ............................. 711/112; 711/114; 714/6; 714/7
(58) Field of Search ................................ 711/112, 114; 714/6, 7

(56) References Cited

U.S. PATENT DOCUMENTS

| 5,574,851 A | * 11/1996 | Rathunde ................. 711/114 |
| 5,787,459 A | * 7/1998 | Stallmo et al. ............ 709/201 |
| 5,809,224 A | * 9/1998 | Schultz et al. ............ 714/7 |
| 5,841,997 A | 11/1998 | Bleiweiss et al. .......... 710/317 |
| 5,941,994 A | * 8/1999 | DeKoning et al. ........... 714/48 |

OTHER PUBLICATIONS

ACM SIGMOD Conference Proceedings, Jun. 1–3, 1988, "A case for redundant arrays of inexpensive disks (RAID)", D. Patterson et al, pp. 109–116.

* cited by examiner

Primary Examiner—Hiep T. Nguyen
(74) Attorney, Agent, or Firm—Mattingly, Stanger & Malur, P.C.

(57) ABSTRACT

A disk array system has a disk storage group, an array controller reading/writing data of the group, a disk interface connecting unit having a plurality of ports for connection with the controller and the group, and a disk interface connection changing unit. In an array configuration information memory, information indicating a relation between the controller and the group is stored. An array configuration changing portion changes the array configuration information in response to a user's request. A connection changing interface informs the changing unit of a connection change based on the changed array configuration information. The changing unit sends instruction information on setting up the connection status among the ports to the connecting unit to establish the configuration indicated by the array configuration information. The connecting unit changes the port connection according to the instruction information sent from the changing unit.

13 Claims, 6 Drawing Sheets

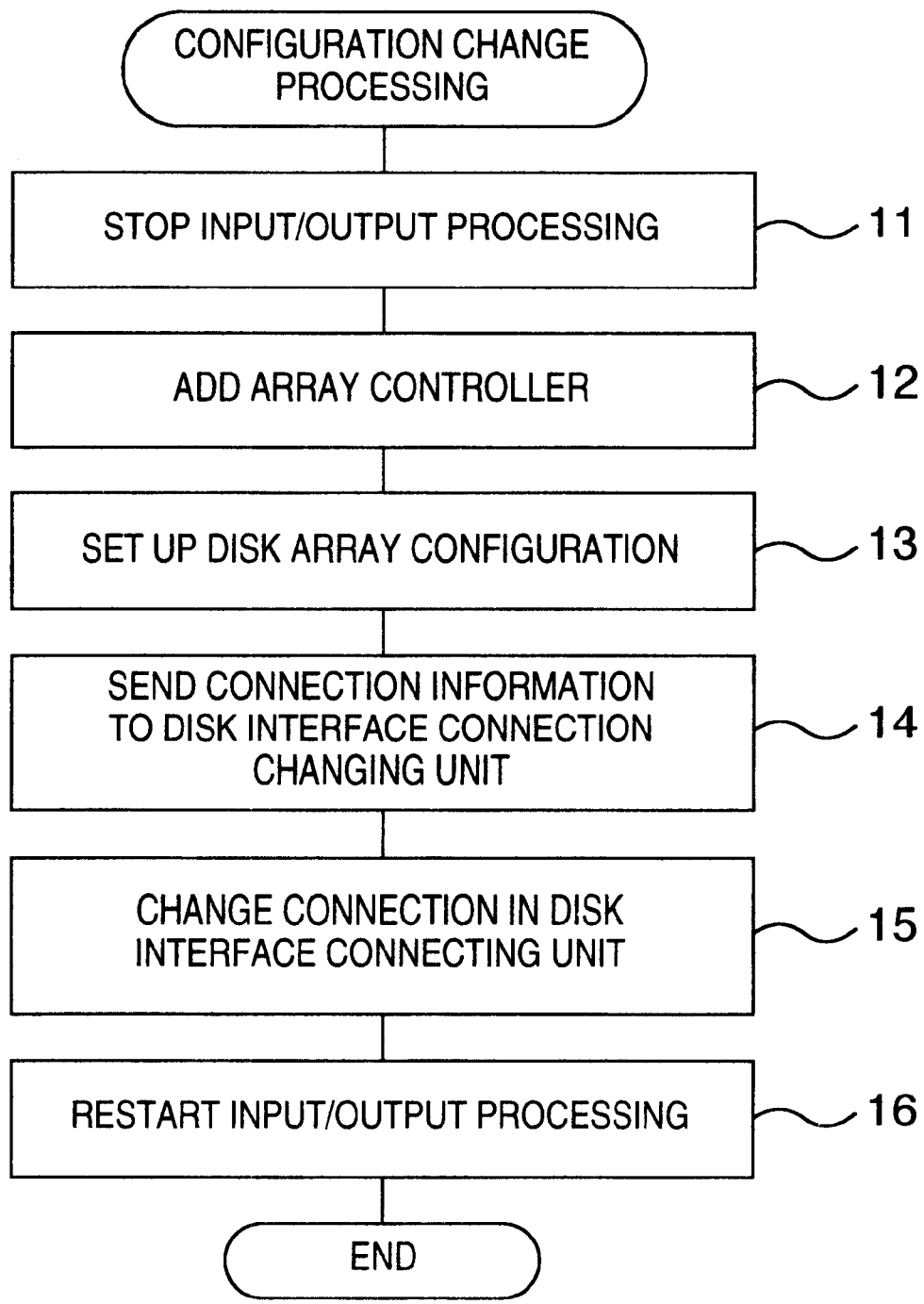

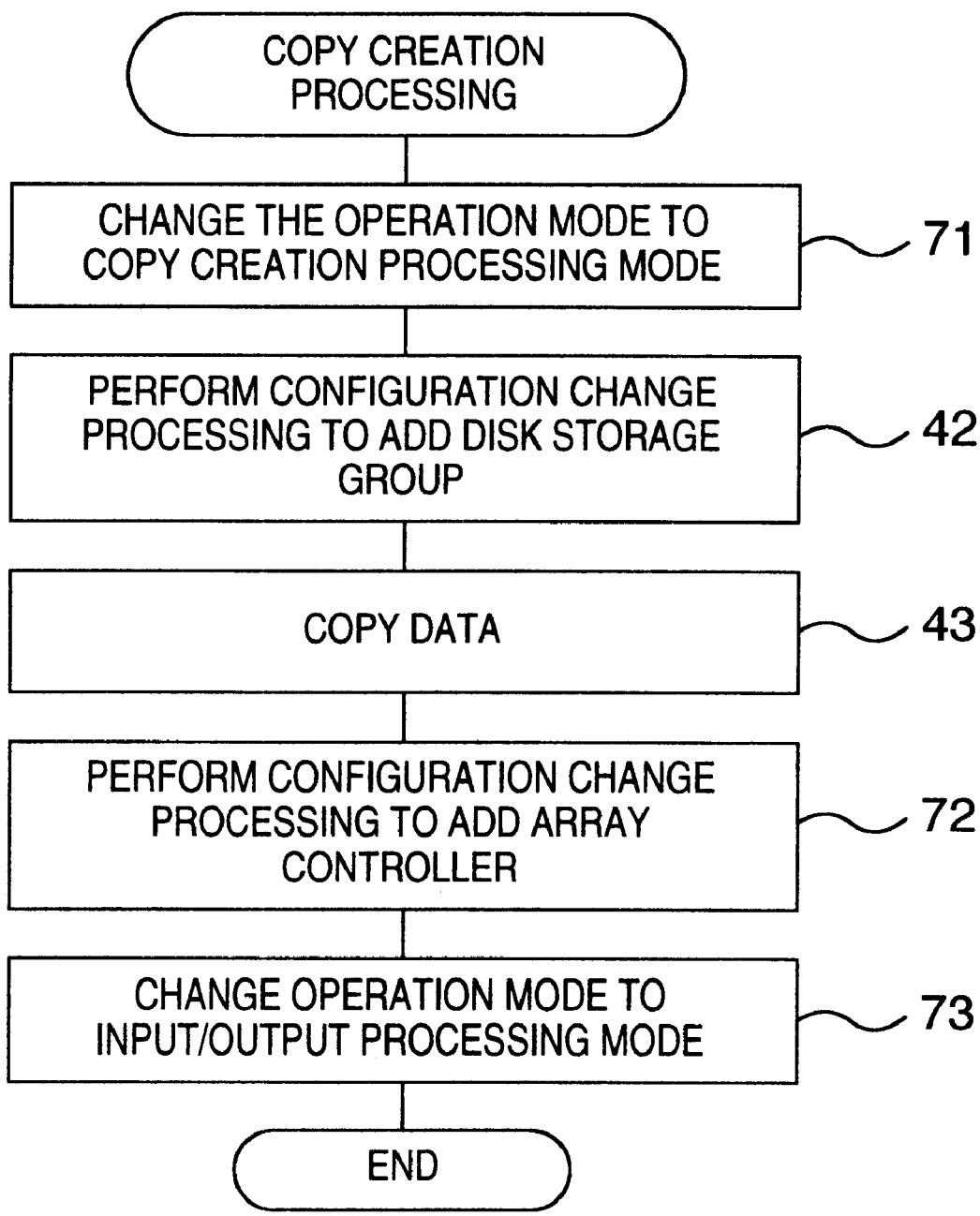

DISK ARRAY SYSTEM AND METHOD OF CHANGING THE CONFIGURATION OF THE DISK ARRAY SYSTEM

BACKGROUND OF THE INVENTION

The present invention relates to a storage system used in a computer system, and more particularly to a disk array system having a plurality of disk storage apparatuses and a method of changing the configuration of the disk array system.

As an example of a storage system used in a computer system, a disk array system disclosed in "A Case for Redundant Arrays of Inexpensive Disks (RAID)" by D. Patterson, et al., ACM SIGMOD Conference Proceeding, Chicago, Ill., June 1–3, 1988, pp. 109–116, is known. A disk array system achieves high performance by making a plurality of physical disk storage apparatuses appear to the processor as one disk storage apparatus. Normally, redundant data is stored on a disk storage apparatus which is separate from a disk storage apparatus on which data is stored. This allows data to be recovered even when an error occurs on the disk storage apparatus on which the data is stored, thus increasing reliability. In relation to data allocation on a disk array, the above publication also describes how to recover data when parity information is used as redundant data. In a disk array system, data is written in bits or bytes or in blocks which are units of data written by the processor. A plurality of pieces of divided data are written on separate disk storage apparatuses. At this time, data is written onto the plurality of disk storage apparatuses concurrently to nominally increase the data transfer rate. For example, if data is distributed on n disk storage apparatuses, the data transfer rate nominally becomes n times faster. In the description given below, a group of disk storage apparatuses on which distributed data is stored is called a RAID group. The host computer identifies one RAID group as one logical drive.

Recently, a fibre channel has been getting much attention as an interface between a disk array and a host computer. The fibre channel is a serial interface the ANSI (American National Standards Institute) X3T11 committee is working toward standardization. The fibre channel allows a maximum of 10 Km between each two nodes and a maximum transfer rate of 1 G bits/second at each node. An FC-AL (Fibre Channel-Arbitrated Loop: hereinafter called an FC loop), when used as the connection topology of a fibre channel, allows up to 127 nodes. That is, as compared with SCSI (Small Computer System Interface), a fibre channel used as the interface (hereinafter called a back-end interface) between a disk array controller, which controls a disk array, and the disk storage apparatuses allows more disk storage apparatuses to be connected to one channel. In addition, the fibre channel, which may be used even if the distance between two nodes is long, enables the array controller to be separated from disk storage apparatuses and allows a plurality of array controllers and a plurality of disk storage apparatuses to be distributed in, and connected to, one FC loop. For example, a communication system with a connection switching switch for changing the configuration of the devices on an FC loop is disclosed in U.S. Pat. No. 5,841, 997. The technology disclosed in this patent allows the user to change, through the software, the configuration of an FC-loop-based system, making it easy to change the configuration manually.

SUMMARY OF THE INVENTION

The publication describing the above technology discloses how to change the configuration of an FC loop through the software but not how to apply it to an actual system. That is, the publication does not describe the problem of how to change and manage the configuration of a disk array system when an FC loop is formed as the back-end interface of the disk array system. Neither does it describe an increase in performance which is achieved by changing the configuration of a disk array system.

It is an object of the present invention to make the configuration of a disk array system be changed easily.

It is another object of the present invention to provide a disk array system which utilizes the expandability of a fibre channel.

To achieve the above objects, the disk array system according to the present invention comprises a disk storage group having at least one disk storage apparatus, an array controller reading data from, or writing data to, the disk storage group, a disk interface connecting unit having a plurality of ports to which the array controller and the disk storage group are connected, and a disk interface connection changing unit controlling a connection status among the plurality of ports in the disk interface connecting unit. The array controller comprises an array configuration information memory storing therein array configuration information indicating a relation between the array controller and the disk storage group controlled by the array controller, an array configuration changing portion changing the array configuration information in response to a user's request, and a connection changing interface informing the disk interface connection changing unit of a connection change based on the changed array configuration information. The disk interface connection changing unit sends instruction information on setting up the connection status among the plurality of ports to the disk interface connecting unit to establish the configuration indicated by the array configuration information. The disk interface connecting unit changes the port connection according to the instruction information sent from the disk interface connection changing unit.

BRIEF DESCRIPTION OF THE DRAWINGS

FIG. 2 is a flowchart showing the flow of configuration change processing of a disk array system.

FIG. 7 is a flowchart showing the flow of copy creation processing.

DESCRIPTION OF THE PREFERRED EMBODIMENTS

Figure 1:
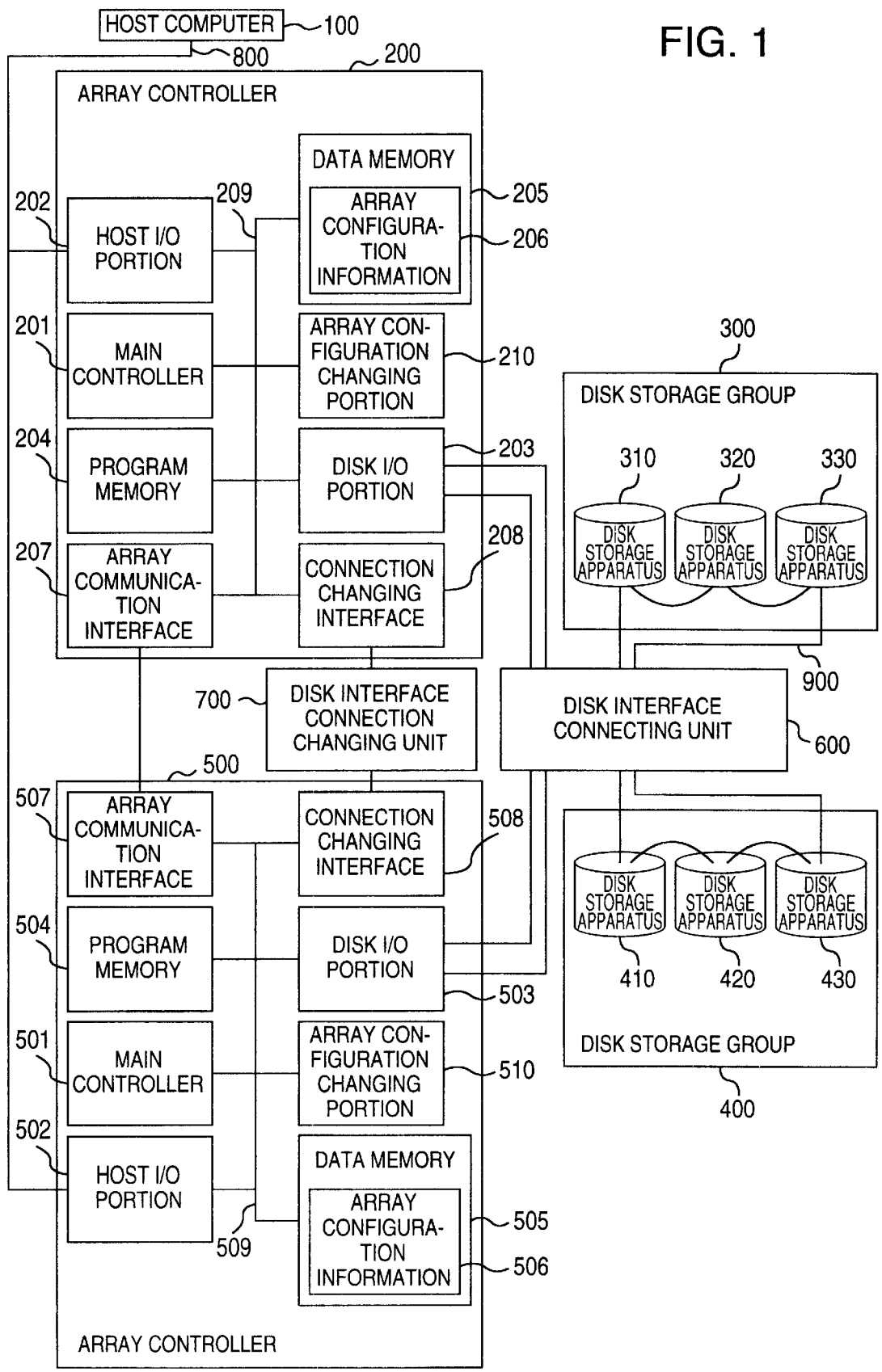
FIG. 1 is a block diagram showing an example of the configuration of a computer system to which the present invention is applied.

FIG. 1 is a block diagram showing the configuration of an example of a computer system to which the present invention is applied. A host computer 100 is connected to a disk array system via a host interface 800. The disk array system comprises array controllers 200 and 500, disk storage groups 300 and 400, a disk interface connecting unit 600, and a disk interface connection changing unit 700.

The array controllers 200 and 500 each have a main controller 201 or 501, a host I/O portion 202 or 502, a disk I/O portion 203 or 503, a program memory 204 or 504, a data memory 205 or 505, an array communication interface 207 or 507, a connection changing interface 208 or 508, and an array configuration changing portion 210 or 510. The main controllers 201 and 501 perform various types of control operation for the disk array system. These components are connected via an array internal bus 209 or 509, respectively. The host I/O portions 202 and 502, connected to the host computer 100 via the host interface 800, send data to, and receive data from, the host computer 100. The disk I/O portions 203 and 503 send data to, and receive data from, the disk storage groups 300 or 400, respectively, via the disk interface connecting unit 600. The program memories 204 and 504 store therein an array control program used, respectively, by the main controllers 201 or 501 to perform various types of control operation. The data memories 205 and 505 store therein array configuration information 206 or 506, respectively, indicating the relation between the array controller and the disk unit group constituting the disk array system. The array communication interfaces 207 and 507 connect, respectively, to the array communication interface in the other array controller for communication between the array controllers. The connection changing interfaces 208 and 508 are an interface with the disk interface connection changing unit 700. The array configuration changing portions 210 and 510 change the array configuration information 206 or 506, respectively, according to a change in the configuration of the disk array system.

The disk storage group 300 includes a plurality of disk storage apparatuses 310, 320, and 330 constituting a first RAID group. The disk storage group 400 includes a plurality of disk storage apparatuses 410, 420, and 430 constituting a second RAID group.

The disk interface connection changing unit 700 informs the disk interface connecting unit 600 of the connection status of a disk interface 900. In response to the connection status specified by the disk interface connection changing unit 700, the disk interface connecting unit 600 sets up the status of connection between the disk storage groups 300 and 400.

The following describes processing that is performed when the configuration of the disk array system described above is changed.

In a first embodiment, the configuration is changed as follows. That is, the array controller 500 is added while the array controller 200 is controlling the disk storage groups 300 and 400. In the new configuration, the array controller 200 controls the disk storage group 300 and the array controller 500 controls the disk storage group 400.

FIG. 2 is a flowchart showing how the configuration of the disk array system will be changed when the configuration is changed as described above. Before the configuration is changed, the system shown in FIG. 1 does not include the array controller 500. And, an FC loop is formed such that the array controller 200 and the disk storage groups 300 and 400 are connected via the disk interface 900 and the disk interface connecting unit 600. To change this configuration, the main controller 201 in the array controller 200 first stops input/output processing being performed in the disk array subsystem (step 11). After the array controller 200 stops input/output processing, the array controller 500 is added. More specifically, the array communication interface 507 in the array controller 500 is connected to the array communication interface 207 in the array controller 200. The connection changing interface 508 is connected to the disk interface connection changing unit 700, and the disk I/O portion 503 is connected to the disk interface connecting unit 600, respectively (step 12). Then, the user enters array configuration information from the operation panel provided on the array configuration changing portion 210 of the array controller 200 to build a desired configuration. In this example, the user sets up the configuration so that the array controller 200 controls the disk storage group 300 and the array controller 500 controls the disk storage group 400. The array controller 200 transfers the user-specified array configuration information 206 to the array controller 500 via the array communication interface 207. The array controller 500 receives the array configuration information transferred from the array controller 200 via the array communication interface 507 and stores it in the data memory 505 as the array configuration information 506 (step 13). In addition, the array controller 200 transfers the array configuration information 206 to the disk interface connection changing unit 700 via the connection changing interface 208 (step 14). Based on the array configuration information received from the array controller 200, the disk interface connection changing unit 700 controls the disk interface connection in the disk interface connecting unit 600 (step 15). After the connection is set up in the disk interface connecting unit 600, the array controllers 200 and 500 start input/output processing (step 16).

Disk interface connection control in the disk interface connecting unit 600, which is executed in step 15, will be described more in detail.

Figure 3A:
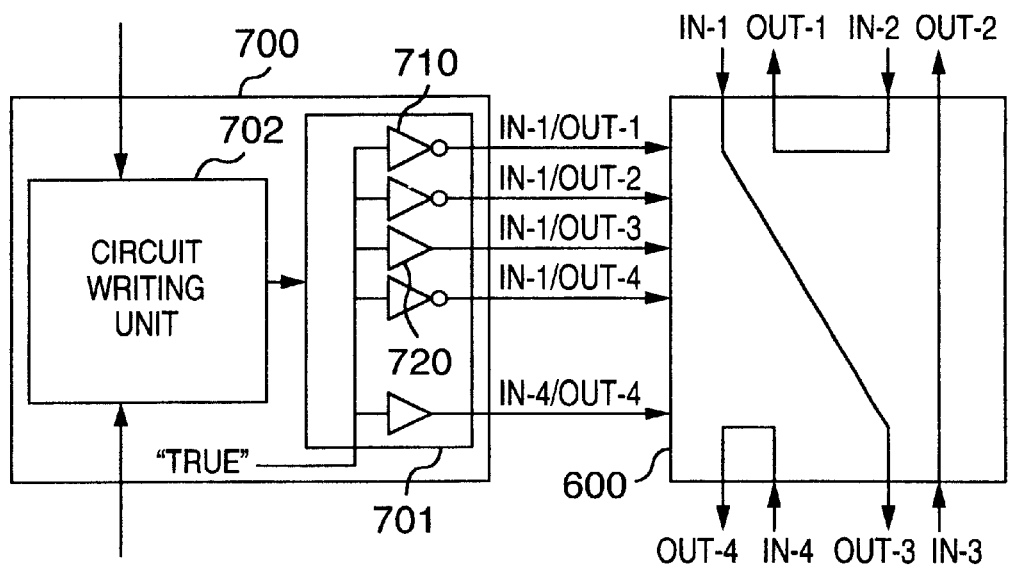
FIGS. 3A and 3B are conceptual block diagrams showing the status of a disk interface connecting unit 600 and a disk interface connection changing unit 700.
Figure 3B:
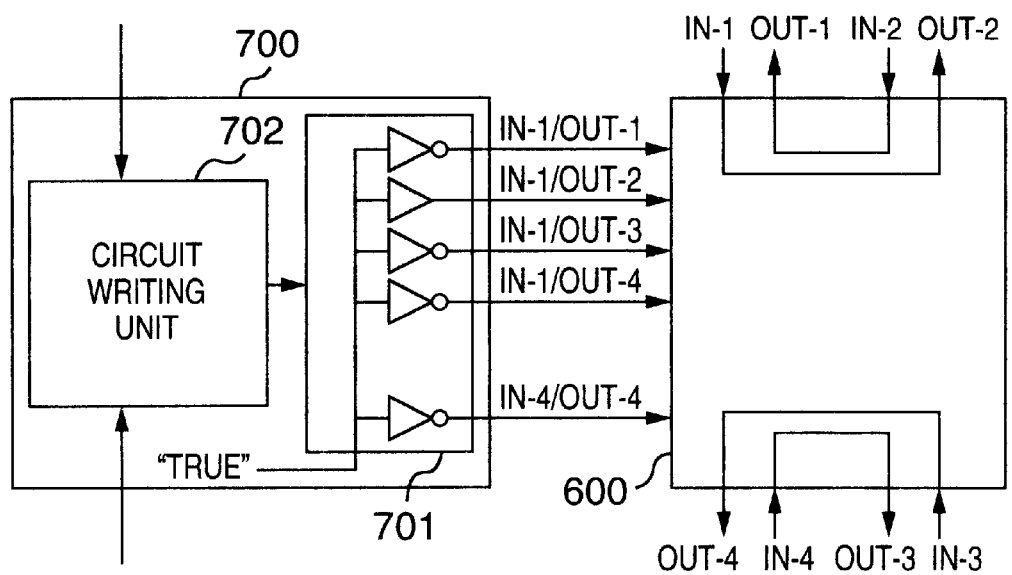

FIGS. 3A and 3B are conceptual block diagrams showing the status of the disk interface connecting unit 600 and the disk interface connection changing unit 700. FIG. 3A shows the status before the configuration is changed, and FIG. 3B shows the status after the configuration is changed.

As shown in the figures, the disk interface connection changing unit 700 is, in an example of construction, composed of an IC 701 which has a non-volatile memory device for rewritably or changeably storing circuit information and a circuit writing unit 702 which writes the circuit information into the IC 701. On the other hand, the disk interface connecting unit 600 has the switch function which determines the connection status according to the circuit information written in the IC 701. The disk interface connecting unit 600 has four input ports (IN-1, . . . , IN-4) and four output ports (OUT-1, . . . , OUT-4). In this description, it is assumed that array controller 200 is connected to "IN-1" and "OUT-1", the disk storage group 300 is connected to "IN-2" and "OUT-2", the disk storage group 400 is connected to "IN-3" and "OUT-3", and that the array controller 500 that will be added is to be connected to "IN-4" and "OUT-4". The circuit information is set in the IC 701 so that, for each combination of the input port (IN) and the output port (OUT), the corresponding logic circuit outputs the "true" signal when the input and the output are connected and the "false" signal when the input and output are not connected. For example, a logic circuit 710 shown in FIG. 3A corresponds to a pair of "IN-1" and "OUT-1. This logic circuit is set up such that the input logical value of "true" is inverted and the logical value of "false" is output. On the other hand, a logic circuit 720 corresponds to a pair of "IN-1" and "OUT-3". This logic circuit is set up such that the input logical value of "true" is not changed and the logical value of "true" is output unchanged. Based on these signals, the disk interface connecting unit 600 connects the input ports to the output ports. In this embodiment, before the configuration is changed, "IN-1" is connected to "OUT-3", "IN-2" is connected to "OUT-1", "IN-3" is connected to "OUT-2", and "IN-4" is connected to "OUT-4". These connections form an FC loop including the array controller 200, disk storage group 300, and disk storage group 400.

In step 15, the array configuration information sent from the array controller 200 is transferred to circuit writing unit 702. Upon receiving the array configuration information, the circuit writing unit 702 converts it to the circuit information that will be used to implement the configuration. The circuit writing unit 702 writes this circuit information into IC 701 to change the connection status in the disk interface connecting unit 600. For example, in this embodiment, the circuit information used to connect "IN-1" to "OUT-2", "IN-2" to "OUT-1", "IN-3" to "OUT-4", and "IN-4" to "OUT-3" is written in the IC 701. This circuit information forms two FC loops: one is composed of the array controller 200 and the disk storage group 300 and the other is composed of the array controller 500 and the disk storage group 400. These FC loops allow the array controller 200 to control the disk storage group 300, and allows the array controller 500 to control the disk storage group 400. The IC 701, a non-volatile device, enables the disk array system configuration to be recovered quickly even after the power is turned off and then the system is restarted.

In the embodiment described above, the array configuration changing portion of the array controller allows the user to specify information on a new array configuration, to change the port-to-port connection status in the disk interface connecting unit 600, and to change the connection among the array controllers 200 and 500 and the disk storage groups 300 and 400. Changing the configuration creates the back-end interface for each of the disk storage groups 300 and 400, thus improving the ability to transfer data to the disk storage groups 300 and 400. In the embodiment described above, the user specifies array configuration information directly from the array configuration changing portion of the array controller. Instead of this method, the array configuration changing portion may receive array configuration information specified, not via the array controller, but via a device such as the host computer 100, for changing the array configuration information stored in the array configuration information memory of the disk array system.

Next, a second embodiment according to the present invention will be described. In this embodiment, the configuration is changed as data is moved from one disk storage group to another. More specifically, the disk storage group 400 is added to the disk array system shown in FIG. 1 which comprises the array controller 200 and the disk storage group 300. After that, data is moved from the disk storage group 300 to the disk storage group 400, and then the system is configured so that the disk array system comprising the array controller 200 and the disk storage group 400 can process I/O processing requests from the host computer.

Figure 4:
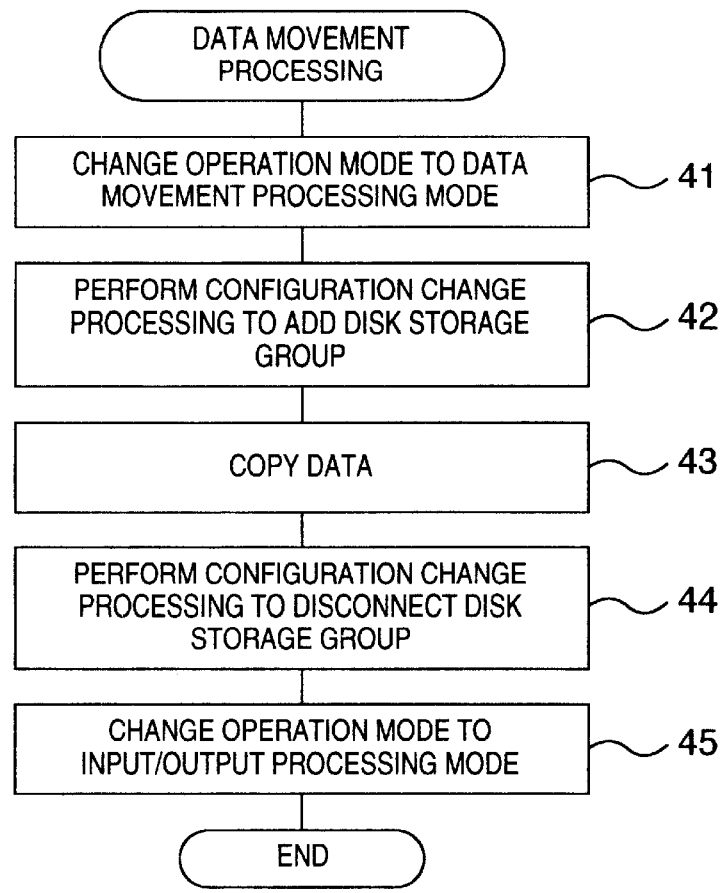
FIG. 4 is a flowchart showing the flow of data movement processing.

FIG. 4 is a flowchart showing the data movement processing flow in this embodiment. Assume that, before the processing is started, the disk array system shown in FIG. 1 includes neither the array controller 500 nor the disk storage group 400 but that it comprises only the array controller 200 and the disk storage group 300.

The data movement processing is started when the user changes the operation mode of the disk array system from the normal mode in which normal I/O processing is executed to the data movement processing mode in which data is moved. When the operation mode is changed to the data movement processing mode, the array controller 200 writes data, contained in the cache memory of the array controller 200 but not yet written to the disk storage group 300 (disk storage apparatuses 310–330), to the disk storage group 300 (disk storage apparatuses 310–330) if there is such data. When the array controller 200 receives a write request from the host computer 100, it stores data, specified by the write request, into the cache memory and, at the same time, writes the data to the disk storage apparatuses 310–330 (step 41). When the operation mode has changed to the data movement processing mode, the configuration change processing is performed. More specifically, the processing similar to the configuration change processing shown in FIG. 2 is performed except that, in step 12, the disk storage group 400, rather than the array controller 500, is added. In steps 13–15, the array configuration information is set up and changed so that the disk storage group 300 and the disk storage group 400 are connected to the FC loop to which the array controller 200 belongs (step 42). After the disk storage group 400 is connected, the array controller 200 copies all data from the disk storage group 300 to the disk storage group 400 via the back-end interface (step 43). When the data has been copied, the configuration change processing is performed again to disconnect the disk storage group 300. During this configuration change processing, the array configuration information is set up and the configuration is changed in steps 13–15 so that the disk storage group 300 is disconnected from the FC loop and the array controller 200 and the disk storage group 400 form an FC loop (step 44). After the disk storage group 300 is disconnected as described above, the operation mode is changed from the data movement processing mode to the normal mode according to the user's instruction and the data movement processing is terminated (step 45).

In this embodiment, a disk storage group may be added and data may be moved from the currently-used disk storage group to the added disk storage group via the back-end interface. That is, a local disk interface loop formed between disk storage groups allows data to be moved between them, eliminating the need to transmit data via the host interface when moving data. This makes the host interface data band available for some other processing. It should be noted that, in step 44 in this embodiment, the array controller 500 may be added as in the first embodiment described above. This allows the array controller 500 and the disk storage group 400 to form an FC loop and, after setting up the configuration so that disk storage group 400 and the array controller 500 continue I/O processing, data may be moved to the disk storage group 400.

Next, a third embodiment according to present invention will be described. In this embodiment, when two disk array systems, composed of a disk array system comprising a first array controller and a first disk storage group and a disk array system comprising a second array controller and a second disk storage group, are in operation and when one of the array controllers fails, the other array controller performs the operation on behalf of the failed array controller. This processing will hereinafter be referred to as "degeneration processing".

The system configuration in this embodiment is the same as that shown in FIG. 1. During a normal operation, two FC loops, that is, an FC loop connecting the array controller 200 and the disk storage group 300 and an FC loop connecting the array controller 500 and the disk storage group 400, are active, each as an independent disk array system. In the description below, the disk array system composed of the array controller 200 and the disk storage group 300 is called disk array A, and the disk array system composed of the array controller 500 and the disk storage group 400 is called disk array B. The array controller 200 and the array controller 500 each send the operation confirmation signal to the other array controller via the array communication interface 207 or 507, respectively, indicating that the array controller 200 and the array controller 500 are operating normally. When one of the array controllers fails, it cannot send this operation confirmation signal and the other array controller detects the failure.

Figure 5:
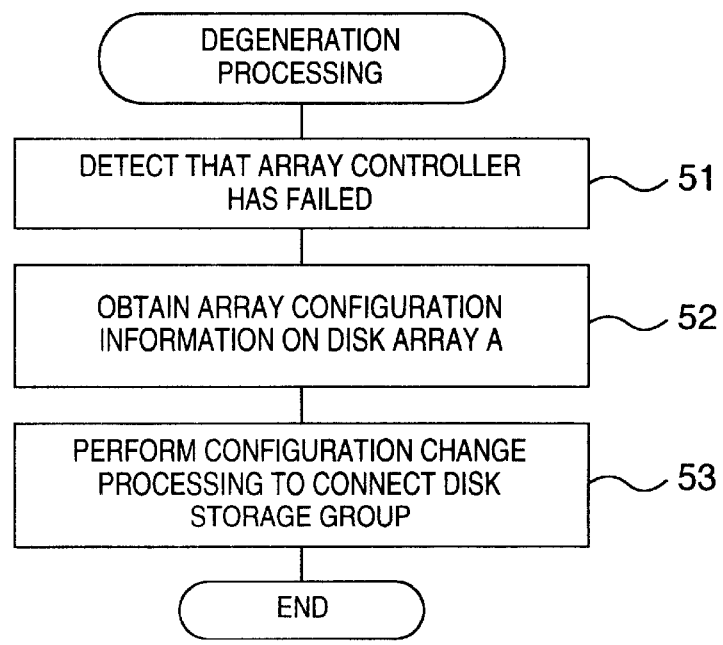
FIG. 5 is a flowchart showing degeneration processing for a failure in an array controller that occurs in a multiple-system disk array system.

FIG. 5 is a flowchart showing degeneration processing that is performed when the array controller 200 of disk array A fails. Upon detecting that the operation confirmation signal is not received from the array controller 200, the array controller 500 of disk array B finds the array controller 200 has failed (step 51). Then, the array controller 500 obtains array configuration information on disk array A, which includes the array controller 200, from the disk interface connection changing unit 700 (step 52). Based on the obtained array configuration information, the array controller 500 identifies the disk storage group 300 connected to the array controller 200. Then, the array controller 500 performs configuration change processing to connect the disk storage group 300, originally connected to the array controller 200, to disk array B which is the disk array of the array controller 500 (step 53). Thereafter, the array controller 500 performs data I/O processing for the disk storage groups 300 and 400.

In this embodiment, when a disk array fails and is not made available, the configuration may be changed with no need for the user to manually change the wiring. Therefore, when the array controller of one of a plurality of disk arrays sharing the disk interface connection changing unit and the disk interface connecting unit fails, the array controller of one of the other disk arrays performs the data I/O operation of the disk storage group belonging to the failed disk array, thereby increasing reliability.

Next, a fourth embodiment will be described. In this embodiment, a copy of a disk array system in use is created. This copy has the same data as that of the disk array system in use.

Figure 6:
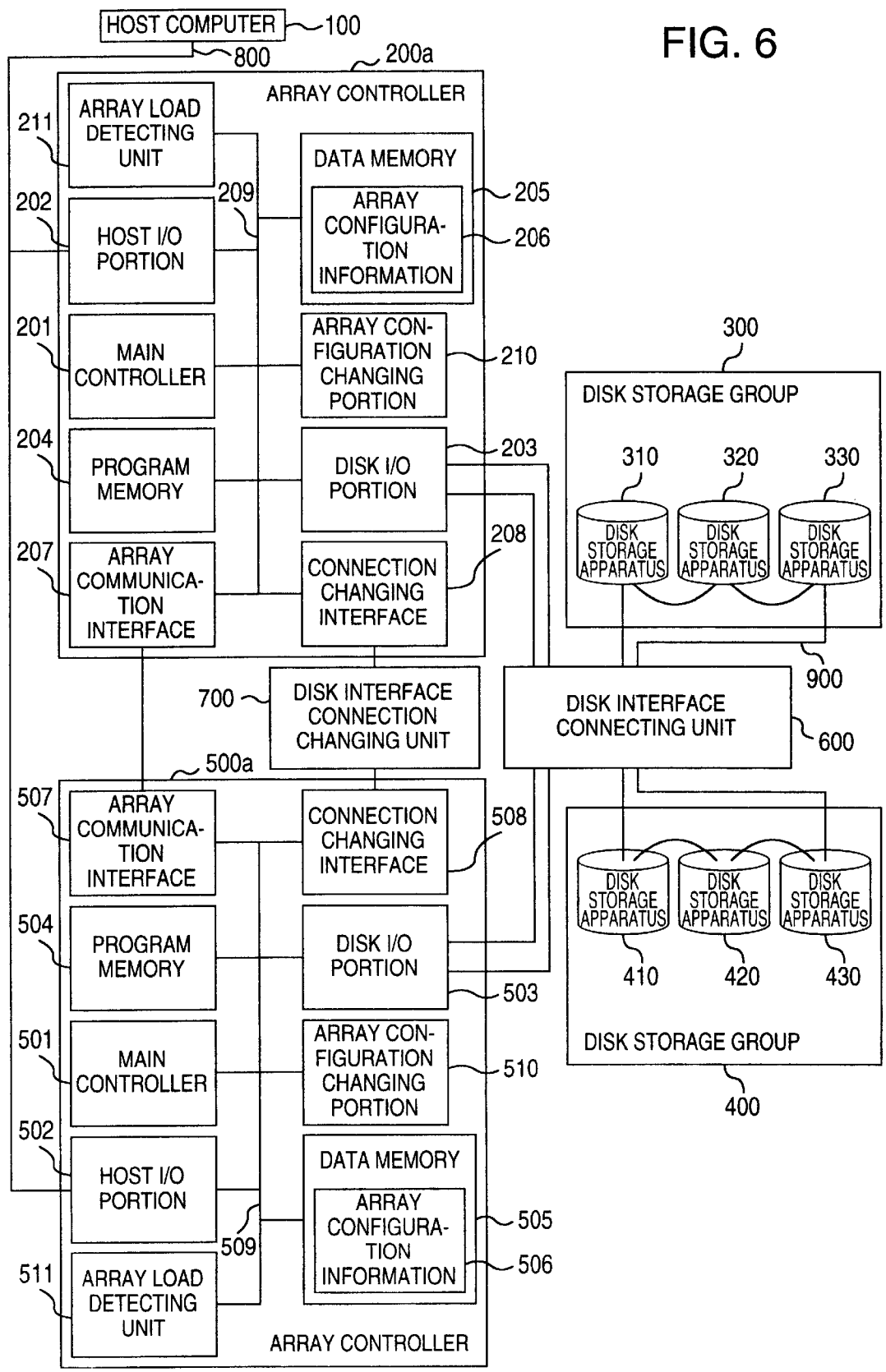
FIG. 6 is a block diagram showing the configuration of the computer system used in a fourth embodiment.

FIG. 6 is a block diagram showing the configuration of a computer system used in this embodiment. The computer system shown in FIG. 6 differs from that shown in FIG. 1 in that array controllers 200a and 500a each have an array load detecting unit 211 or 511. The array load detecting units 211 and 511 each detect the load status of the disk array systems controlled by the array controllers 200 and 500, respectively. The functions of other components are similar to those of the components shown in FIG. 1 and the description of such components is not repeated here. In the description of this embodiment, it is assumed that the system includes neither the array controller 500 nor the disk storage group 400 and that an FC loop connecting the array controller 200 and disk storage group 300 is provided.

FIG. 7 is a flowchart showing the copy creation processing flow.

When the array load detecting unit 211 detects that the load of the disk array subsystem has exceeded a predetermined threshold, the array controller 200 switches the operation mode of the disk array system from the normal mode to the copy creation processing mode in which a copy is created. Although, in the description below, this switching is assumed to be automatic, the user may request the mode to switch according to the load status detected by the array load detecting unit. More specifically, the mode is switched (step 71) in the same manner as in the second embodiment in which the mode is switched from normal mode to the data movement mode (step 41 in FIG. 4). When the mode has been switched to the copy creation processing mode, the disk storage group 400 is connected to the FC loop to which the disk storage group 300 is connected, as in steps 42 and 43 of the data movement processing. Then, data is copied from the disk storage group 300 to the disk storage group 400 (steps 42 and 43). When the data has been copied, the array controller 500 is added as described in the first embodiment. And, the array configuration information is set up and changed so that two FC loops, that is, an FC loop which connects the array controller 200 and the disk storage group 300 and an FC loop which connects the array controller 500 and the disk storage group 400, are formed (step 72). Finally, the operation mode of the array controller 200 is returned to the normal mode and then the processing is terminated (step 73).

In this embodiment, the user may copy data and create a copy of an existing disk array without using the host interface.

Next, a fifth embodiment according to the present invention will be described. In this embodiment, a disk array is duplexed.

In this embodiment, a disk array system comprises the array controller 200, disk storage group 300, and disk storage group 400 which are shown in the figure. The array controller 500 is provided as a standby system. Depending upon the load status of the disk array system, the disk storage group 400 is assigned to the array controller 500 provided as the standby system to configure a new disk array system to duplex the disk array.

In this embodiment, duplexing is started when the array load detecting unit 211 of the array controller 200 detects that the load has exceeded a predetermined threshold or when the user specifies the start of duplexing. When duplexing is started, the operation mode of the disk array system is changed from the normal mode to the duplexing processing mode and the processing performed in step 41 of the data movement processing is performed. Thereafter, the configuration is changed as when a copy is created. That is, two disk array systems are built by forming two back-end FC loops: a back-end FC loop including the array controller 200 and the disk storage group 300 and a back-end FC loop including the array controller 500 and the disk storage group 400. Finally, the operation mode of the array controller 200 is changed from the duplexing processing mode to the normal mode and then the duplexing processing is terminated.

In this embodiment, the user may duplex a disk array using an array controller, provided as the standby controller, to build a disk array system with two disk array back-end FC loops. This doubles the data transfer amount of the back-end interface. Note that, before the configuration is changed, data may be copied between the disk storage groups via back-end FC loops to create a duplexed disk array system in which the same data is stored.

Thus, in the disk array system according to the present invention, the connection status in the disk interface connecting unit, which establishes connection between array controllers and disk storage groups, is changed according to the user-specified array configuration information. Therefore, the user need not manually change the wiring when changing the disk array configuration. This reduces both the user's load and possible connection errors and enables the user to change the configuration more reliably. In addition, the user can configure the disk array system more flexibly.

What is claimed is:

1. A disk array system comprising:
a disk storage group having at least one disk storage apparatus;
an array controller reading data from, or writing data to, said disk storage group;
a disk interface connecting unit having a plurality of ports to which said array controller and said disk storage group are connected; and
a connection changing unit controlling a connection status among said plurality of ports in said disk interface connecting unit,
wherein said array controller comprises an array configuration information memory storing therein array configuration information indicating a relation between the array controller and the disk storage group controlled by the array controller, an array configuration changing portion changing said array configuration information in response to a user's request, and a connection changing interface informing said connection changing unit of a connection change based on the changed array configuration information, and
wherein said connection changing unit changes the connection status in the disk interface connecting unit according to the information from said array controller.

2. The disk array system according to claim 1, wherein said array configuration changing portion receives the array configuration information changed by the user via a host computer.

3. The disk array system according to claim 1, wherein said connection changing unit comprises non-volatile storage means for storing therein circuit information and circuit information writing means for converting the array configuration information, changed based on the information from said array controller, to the circuit information and for writing the converted information into said non-volatile storage means, wherein said disk interface connecting unit functions as a switch determining the connection status according to the circuit information written into said non-volatile storage means.

4. In a disk array system comprising a plurality of disk storage groups each having at least one disk storage apparatus; an array controller reading data from, or writing data to, said disk storage groups; a disk interface connecting unit having a plurality of ports to which said array controller and said disk storage groups are connected; and a connection changing unit controlling a connection status among said plurality of ports in said disk interface connecting unit, a method of changing a configuration of said disk array system comprising the steps of:
updating array configuration information stored in said array controller and indicating the configuration of said disk array system;
sending said array configuration information from said array controller to said connection changing unit;
sending, from said connection changing unit to said disk interface connecting unit, instruction information on a connection relation among said plurality of ports based on said array configuration information; and
changing, in said disk interface connecting unit, the connection among said plurality of ports based on the instruction information on said connection relation.

5. In a disk array system comprising a first disk storage group having at least one disk storage apparatus; a first array controller reading data from, or writing data to, said disk storage group; a disk interface connecting unit having a plurality of ports including a first port to which said array controller is connected and a second port to which said disk storage group is connected; and a connection changing unit controlling a connection status among said plurality of ports in said disk interface connecting unit, a method of changing a configuration of said disk array system comprising the steps of:
processing, in said first array controller, an input/output request sent from a higher-level unit to said first disk storage group, while said first port and said second port are connected;
updating first array configuration information to second array configuration information in said first array controller, said first array configuration information being stored in said first array controller and indicating that said first disk storage group be connected to said first array controller, said second array configuration information indicating that said first disk storage group and a second disk storage group be connected to said first array controller, said second disk storage group being connected to a third port which is connected neither said first port nor said second port;
sending said second array configuration information to said connection changing unit;
sending, from said connection changing unit to said disk interface connecting unit, instruction information on a connection relation among said plurality of ports based on said second array configuration information; and
changing, by said disk interface connecting unit, the connection among said plurality of ports in response to said instruction information so that said first, second, and third ports are connected.

6. The method according to claim 5, further comprising the step of transferring data stored in said first disk storage group to said second disk storage group under control of said first array controller with no intervention from the higher-level unit.

7. The method according to claim 6, further comprising the steps of:
changing said second array configuration information to third array configuration information in said first array controller, said third array configuration information indicating that the array system including said first array controller and said second disk storage group but not including said first disk storage group be configured;
transferring said third array configuration information to said connection changing unit;
sending, from said connection changing unit to said disk interface connecting unit, the instruction information on the connection relation among said plurality of ports based on said third array configuration information; and
changing, by said disk interface connecting unit, the connection among said plurality of ports in response to said instruction information so that said first port and said third port are connected and said second port is disconnected from said first and third ports.

8. The method according to claim 6, further comprising the steps of:
changing said second array configuration information to third array configuration information in said first array controller, said third array configuration information indicating that a first array system and a second array system be configured, said first array system comprising said first array controller and said first disk storage group, said second array system comprising a second array controller connected to a fourth port which is not connected to said first, second, or third port and said second disk storage group;

transferring said third array configuration information to said connection changing unit;

sending, from said connection changing unit to said disk interface connecting unit, the instruction information on the connection relation among said plurality of ports based on said third array configuration information; and changing, by said disk interface connecting unit, the connection among said plurality of ports in response to said instruction information so that said first port and said second port are connected and said third port and said fourth port are connected.

9. The method according to claim 8, wherein said steps are executed when a load status detected in said first array controller has exceeded a predetermined threshold.

10. In a disk array system comprising a first disk storage group and a second disk storage group each of which includes at least one disk storage apparatus, a first array controller and a second array controller controlling an input/output request sent from a higher-level unit to said disk storage group, a disk interface connecting unit to which said first and second disk storage groups and said first and second array controllers are connected, and a connection changing unit controlling a connection status among said first and second disk storage groups and said first and second array controllers in said disk interface connecting unit, a method of changing a configuration of said disk array system, comprising the steps of:

(a) interconnecting, by said disk interface connecting unit, said first array controller, said first disk storage group, and said second disk storage group to configure a first array system comprising first array controller, said first disk storage group, and said second disk storage group;

(b) changing first configuration information to second configuration information, said first configuration information being stored in said first array controller and indicating the configuration of said first array system, said second configuration information indicating a second array system and a third array system, said second array system comprising said first array controller and said first disk storage group, said third array system comprising said second array controller and said second disk storage group;

(c) transferring said second configuration information to said connection changing unit;

(d) generating, in said connection changing unit, connection information indicating a new connection status in said disk interface connecting unit, based on said second configuration information; and (e) changing, by said disk interface connecting unit, said connection status based on said connection information so that said first array controller and said first disk storage group are connected and, at the same time, said second array controller and said second disk storage group are connected.

11. The method according to claim 10, further comprising the step of checking a load status of said first array system in said first array controller wherein, upon detecting that the load status has exceeding a predetermined threshold, said steps of (b) to (e) are executed.

12. The method according to claim 11, further comprising the step of copying data, stored by said first array controller in said first disk storage group, to said second disk storage group, said step being executed before said step of (d).

13. In a disk array system comprising a disk storage group having at least one disk storage apparatus; a first array controller reading data from, or writing data to, said first disk storage group; a disk interface connecting unit connecting said array controller and said disk storage group; and a connection changing unit controlling a connection status in said disk interface connecting unit, a method of changing a configuration of said disk array system comprising the steps of:

checking, by a second array controller, for a failure in said first array controller, said second array controller not being connected to said disk storage group by said disk interface connecting unit;

transferring, by said second array controller, configuration information to said connection changing unit in response to a detection of the failure in said first array controller, said configuration information indicating the configuration of the array system comprising said second array controller and said first disk storage group connected to said first array controller;

transferring, by said connection changing unit, connection information to said disk interface connecting unit based on said configuration information, said connection information indicating that said second array controller be connected to said first disk storage group connected to said first array controller; and disconnecting, by said disk interface connecting unit, said first disk storage group connected to said first array controller from said first array controller and connecting said first disk storage group to said second array controller, based on said connection information.

* * * * *